(12) United States Patent
Holtcamp et al.

(10) Patent No.: US 8,148,470 B1
(45) Date of Patent: Apr. 3, 2012

(54) PROCESSES FOR MAKING MULTIMODAL MOLECULAR WEIGHT DISTRIBUTION POLYOLEFINS

(75) Inventors: Matthew W. Holtcamp, Huffman, TX (US); Matthew S. Bedoya, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/950,501

(22) Filed: Nov. 19, 2010

(51) Int. Cl.
*C08F 8/00* (2006.01)
*C08F 2/00* (2006.01)
*C08F 2/38* (2006.01)
*C08F 4/00* (2006.01)

(52) U.S. Cl. ............ 525/192; 525/195; 526/75; 526/82; 526/84; 526/89

(58) Field of Classification Search ............ 525/192, 525/195; 526/75, 82, 84, 89
See application file for complete search history.

(56) References Cited

U.S. PATENT DOCUMENTS

| 4,461,873 A | 7/1984 | Bailey et al. |
| 7,163,906 B2 | 1/2007 | McDaniel et al. |
| 7,629,422 B2 | 12/2009 | Goode et al. |
| 2008/0287617 A1 | 11/2008 | Holtcamp |
| 2010/0190937 A1* | 7/2010 | Hoang et al. ............... 526/108 |

FOREIGN PATENT DOCUMENTS

| EP | 0 057 420 | 8/1982 |
| EP | 0 619 325 | 10/1994 |
| WO | WO 99/03899 | 1/1999 |

* cited by examiner

*Primary Examiner* — Nathan M Nutter
(74) *Attorney, Agent, or Firm* — Renuka Ganesh

(57) ABSTRACT

This invention relates to a process to make a multimodal polyolefin composition comprising: (i) contacting at least one first olefin monomer with a mixed catalyst system, under polymerization conditions, to produce at least a first polyolefin component having a Mw of 5,000 g/mol to 600,000 g/mol, wherein the mixed catalyst system comprises: (a) at least one polymerization catalyst comprising a Group 4 or Group 5 transition metal; (b) at least one organochromium polymerization catalyst; (c) an activator; and (d) a support material; (ii) thereafter, contacting the first polyolefin component/mixed catalyst system combination with a molecular switch; (iii) contacting the first polyolefin component/mixed catalyst system combination with at least one second olefin monomer, which may be the same or different, under polymerization conditions; and (iv) obtaining a multimodal polyolefin composition.

20 Claims, 1 Drawing Sheet

Figure 1: First polyolefin component Produced Using Catalyst 2
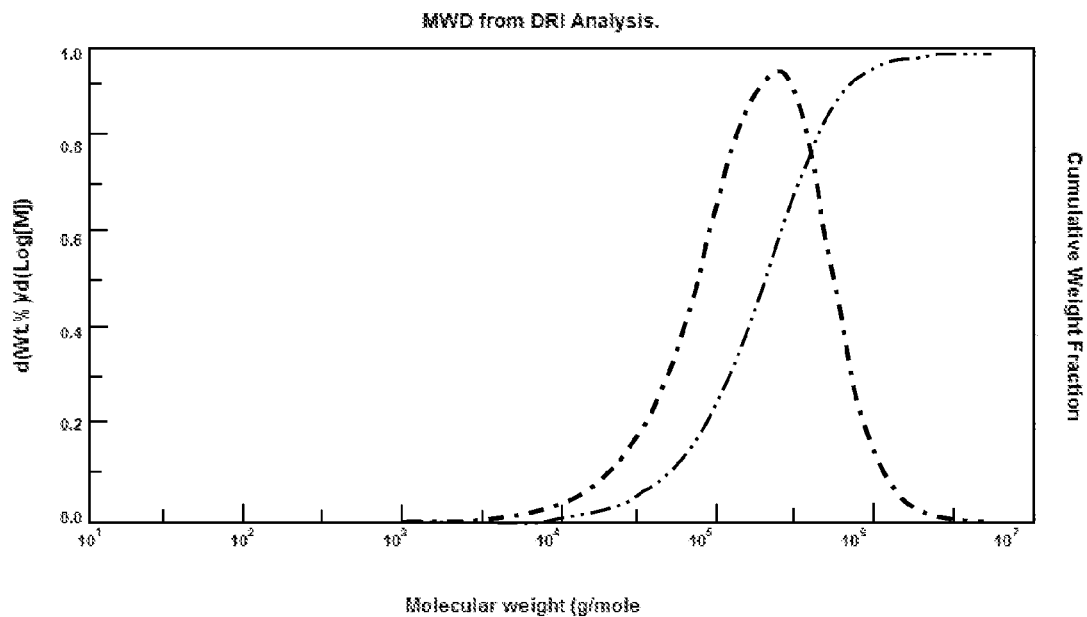
Figure 2: Bimodal Molecular Weight Distribution Polymer Composition Produced Using Catalyst 2 Activated With A Molecular Switch
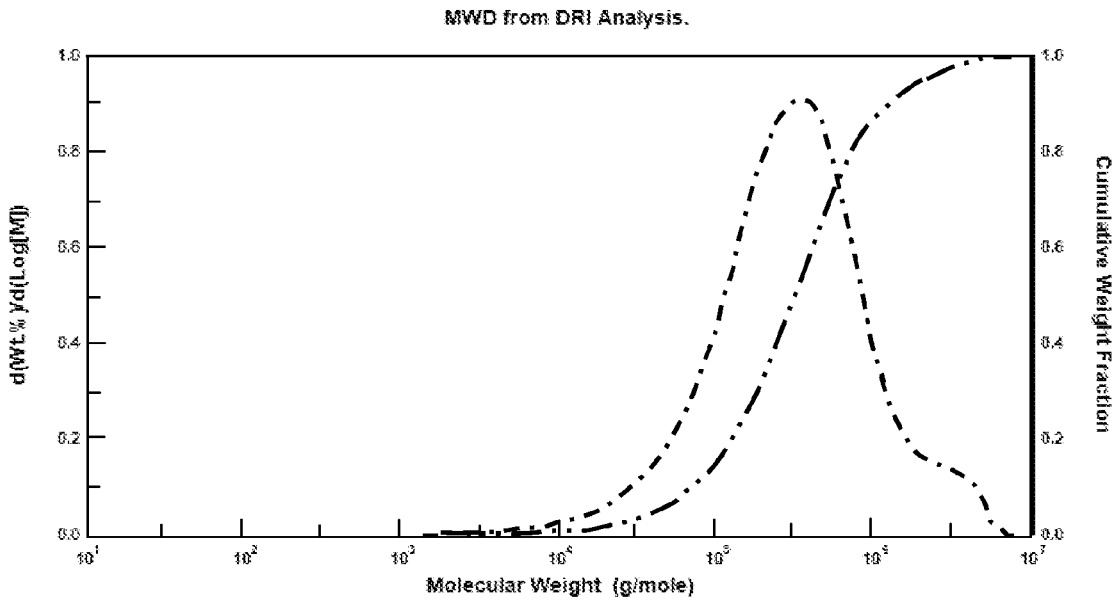

US 8,148,470 B1

PROCESSES FOR MAKING MULTIMODAL MOLECULAR WEIGHT DISTRIBUTION POLYOLEFINS

FIELD OF THE INVENTION

This invention relates to the field of olefin polymerization, particularly methods for the polymerization and copolymerization of olefins using a mixed catalyst composition.

BACKGROUND OF THE INVENTION

Polyolefins having a bimodal molecular weight distribution are desirable because they can combine the advantageous mechanical properties of the high molecular weight fraction with the improved processing properties of the low molecular weight fraction. This provides a polyolefin with a useful and desirable combination of properties, as compared to polyolefins of the high molecular weight fraction or the low molecular weight fraction alone. For example, although typically high molecular weight confers desirable mechanical properties and stable bubble formation onto polyolefin polymers, it also often inhibits extrusion processing by increasing backpressure in extruders, promotes melt fracture defects in the inflating bubble, and potentially, promotes too high a degree of orientation in the finished film. On the other hand, low molecular weight polyolefins typically have excellent processibility, but poor strength. A multimodal molecular weight distribution polyolefin comprising both a low molecular weight fraction and a high molecular weight fraction retaining the desirable mechanical properties, stable bubble formation, reduced extruder backpressure, and inhibited melt fracture is thus desirable. Such polyolefins could find tremendous utility in films and other articles requiring such a useful and desirable combination of properties.

Polyolefins having a multimodal molecular weight distribution may be obtained by physically blending a high molecular weight polyolefin with a low molecular weight polyolefin, as disclosed in U.S. Pat. No. 4,461,873. However, these physically produced blends typically contain high gel levels, which lead to poor film appearance due to those gels. Despite improvements in processability, blending tends to be expensive, requires complete homogeneity of the melt blend, and adds a cumbersome additional blending step to the manufacturing/fabrication process.

Some industrial processes operate using multiple reactor technology to produce a processable bimodal molecular weight distribution polyethylene product in two or more reactors. In a multiple reactor process, each reactor produces a single component of the final product. For example, as described in EP 0 057 420, the production of bimodal molecular weight distribution high density polyethylene is carried out by a two step process, using two reactors in series. In the two step process, the process conditions and the catalyst can be optimized in order to provide a high efficiency and yield for each step in the overall process. However, using multiple reactor technology adds cost and processing considerations.

It is, however, difficult to make bimodal molecular weight distribution polyolefins such as bimodal molecular weight distribution polyethylene, for example, with a single catalyst because two separate sets of reaction conditions are typically needed. Instead, others in the art have tried to produce two polymers together at the same time, in the same reactor, using two different catalysts.

Catalyst systems comprising two different metallocene catalysts are disclosed in the production of bimodal molecular weight distribution polyolefins in EP 0 619 325. EP 0 619 325 describes a process for preparing polyolefins, such as polyethylenes, having a multimodal or at least bimodal molecular weight distribution. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained which is at least bimodal.

WO 99/03899 discloses the use of a catalyst composition which produces, in a single reactor, polyethylene with a broad or bimodal molecular weight distribution. The catalyst is prepared from the interaction of silica, previously calcined at 600° C., with dibutylmagnesium, 1-butanol and titanium tetrachloride, and a solution of methylalumoxane and ethylenebis[1-indenyl]zirconium dichloride.

U.S. Pat. No. 7,163,906 discloses a catalyst composition comprising the contact product of at least one metallocene compound, at least one organochromium polymerization catalyst, a fluorided silica, and at least one alkyl aluminum compound, which is then used to polymerize ethylene in an inert atmosphere. The metallocene used in the Examples of U.S. Pat. No. 7,163,906 is bis(n-butylcyclopentadienyl)zirconium dichloride and the organochromium compounds used include dicumene chromium and chromocene. The metallocene-organochromium catalyst system disclosed in U.S. Pat. No. 7,163,906 produced polyethylenes characterized by very broad molecular weight distributions, ranging from 70.3 to 8.4. The polyethylene produced in U.S. Pat. No. 7,163,906 exhibits an intermediate molecular weight distribution with a central high peak attributed to metallocene component and broad tails on both high and low molecular weight sides attributed to the chromium component. Further, U.S. Pat. No. 7,163,906 does not disclose using a molecular switch to activate one catalyst and deactivate the other.

There remain significant challenges in developing processes that can provide control over the various molecular weight fraction of polyolefins with a multimodal molecular weight distribution. Accordingly, there is a need for processes that allow particular control over the composition of each mode of the multimodal molecular weight distribution polymer.

SUMMARY OF THE INVENTION

This invention relates to a process to make a multimodal polyolefin composition comprising: (i) contacting at least one first olefin monomer with a mixed catalyst system, under polymerization conditions, to produce at least a first polyolefin component having a Mw of 5,000 g/mol to 600,000 g/mol, wherein the mixed catalyst system comprises: (a) at least one polymerization catalyst comprising a Group 4 or Group 5 transition metal; (b) at least one organochromium polymerization catalyst; (c) an activator; and (d) a support material; (ii) thereafter, contacting the first polyolefin component/mixed catalyst system combination with a molecular switch; (iii) contacting the first polyolefin component/mixed catalyst system combination with at least one second olefin monomer, which may be the same or different from the first olefin monomer, under polymerization conditions; and (iv) obtaining a multimodal polyolefin composition.

This invention further relates to a mixed catalyst system comprising: (i) at least one polymerization catalyst comprising a Group 4 or Group 5 transition metal; (ii) an activator; (iii) at least one organochromium polymerization catalyst; and (iv) a support material; wherein under polymerization conditions where the polymerization catalyst comprising a Group 4 or Group 5 transition metal is active, the organochromium polymerization catalyst has an activity at least 50% less than the activity of the polymerization catalyst comprising a Group 4 or Group 5 transition metal; and wherein after contact with a molecular switch and under polymerization conditions, the organochromium polymerization catalyst has an activity at least 50% greater than the activity of the polymerization catalyst comprising a Group 4 or Group 5 transition metal.

This invention further relates to a method of making a supported mixed catalyst system comprising: (i) contacting a support material with a polymerization catalyst comprising a Group 4 or a Group 5 transition metal and an activator, such that the reactive groups on the support material are titrated, to form a supported polymerization catalyst; and (ii) thereafter contacting the supported polymerization catalyst with an organochromium polymerization catalyst to form a supported mixed catalyst system; wherein under polymerization conditions where the polymerization catalyst comprising a Group 4 or Group 5 transition metal is active, the organochromium polymerization catalyst has an activity at least 50% less than the activity of the polymerization catalyst comprising a Group 4 or Group 5 transition metal; and wherein after contact with a molecular switch and under polymerization conditions, the organochromium polymerization catalyst has an activity at least 50% greater than the activity of the polymerization catalyst comprising a Group 4 or Group 5 transition metal.

BRIEF DESCRIPTION OF THE DRAWINGS

FIG. 1 represents a monomodal polyethylene molecular weight distribution obtained using Catalyst 2 (a supported bis(1-methyl, 3-butyl cyclopentadienyl)zirconium dichloride/bis(cyclopentadienyl) chromium mixed catalyst system).

FIG. 2 represents a bimodal polyethylene molecular weight distribution obtained using Catalyst 2 activated by a molecular switch (a supported bis(1-methyl, 3-butyl cyclopentadienyl)zirconium dichloride/bis(cyclopentadienyl) chromium mixed catalyst system, exposed to oxygen and triethylaluminum).

DETAILED DESCRIPTION

The inventors have surprisingly discovered that a multimodal molecular weight distribution polyolefin may be produced, with control over each mode, by use of a supported mixed catalyst system and a molecular switch. As used herein, "molecular weight" means weight average molecular weight (Mw), unless otherwise stated.

In embodiments herein, the invention relates to a process comprising: (i) contacting at least one first olefin monomer with a mixed catalyst system, under polymerization conditions, to produce at least a first polyolefin component having a Mw of 5,000 g/mol to 600,000 g/mol, wherein the mixed catalyst system comprises: (a) at least one polymerization catalyst comprising a Group 4 or Group 5 transition metal; (b) at least one organochromium polymerization catalyst; (c) an activator; and (d) a support material; (ii) thereafter, contacting the first polyolefin component/mixed catalyst system combination with a molecular switch; (iii) contacting the first polyolefin component/mixed catalyst system combination with at least one second olefin monomer, which may be the same or different, under polymerization conditions; and (iv) obtaining a multimodal polyolefin composition.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. A "polymer" has two or more of the same or different mer units. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically.

As used herein, the term "mixed catalyst system" is used to mean any composition or mixture that includes (i) at least two different catalyst compounds, herein, a polymerization catalyst comprising a Group 4 or Group 5 transition metal which is capable of being quenched or deactivated by a molecular switch and an organochromium polymerization catalyst which is capable of being activated by a molecular switch; (ii) an activator; and (iii) a support material, the components as described below.

The term "multimodal," when used to describe a polymer or polymer composition means "multimodal molecular weight distribution," which is understood to mean that the Gel Permeation Chromatography (GPC) trace, plotted as d(wt %)/d(Log [M]) versus weight average molecular weight (g/mole), has more than one peak or inflection points. An "inflection point" is that point where the second derivative of the curve changes in sign (e.g., from negative to positive or vice versa). For example, a polyolefin composition that includes a first low molecular weight polymer component and a second high molecular weight polymer component is considered to be a "bimodal" polyolefin composition. The polymer composition has a "molecular weight distribution" (or MWD) which means the ratio of Mw to number average molecular weight (Mn) or Mw/Mn. Mw and Mn are determined by GPC.

A "molecular switch," as used herein, serves to decrease, or switch off, or quench the activity of the polymerization catalyst comprising a Group 4 or Group 5 transition metal, and increase or switch on the activity of the organochromium polymerization catalyst. In preferred embodiments, the molecular switch comprises a first component of oxygen and a second component of an alkyl aluminum compound. The components of the molecular switch may be introduced to the process sequentially. In preferred embodiments, the oxygen is contacted with the first polyolefin component/mixed catalyst system, and thereafter the alkyl aluminum compound is added under polymerization conditions, including, preferentially, an inert atmosphere.

For the purposes of this invention and the claims thereto, the new numbering scheme for the Periodic Table Groups is used as in CHEMICAL AND ENGINEERING NEWS, 63(5), 27 (1985). Therefore, a "Group 4 metal" is an element from Group 4 of the Periodic Table.

"Catalyst activity" is a measure of how many grams of polymer (P) are produced using a polymerization catalyst comprising W of transition metal (M), over a period of time of T hours; and may be expressed by the following formula: P/(T×W). "Active," as used herein to refer to polymerization catalysts, means the polymerization catalyst has a catalyst activity of at least 50 g(molM)$^{-1}$hr$^{-1}$, where M is the transition metal moiety present in the catalyst component of the mixed catalyst system that the activity can be attributed to. "Inactive," as used herein to refer to polymerization catalysts, means the polymerization catalyst has a catalyst activity of less than 50 g(molM)$^{-1}$hr$^{-1}$. For the purpose of the claims, and discussions of relative activity herein, activity is calculated, as shown above, from polymerization data obtained from a polymerization conducted in a 75 mL cylindrical reactor, at a pressure of 200 psi (1.38 MPa), and with ethylene. The reactor was then heated to a temperature of 85° C. and kept at this temperature for 45 minutes.

The inventors have found that the polymerization catalyst comprising a Group 4 or Group 5 transition metal and the organochromium polymerization catalyst differ in molecular switch response. "Molecular switch response" refers to the relative activity of the catalysts after contact with the molecular switch, for example, exposure to oxygen for 5 minutes, and then subject to activation with an alkyl aluminum compound under polymerization conditions, as compared with the activity of the same catalysts under polymerization conditions including an inert atmosphere. Upon contact with the molecular switch, and subject to polymerization conditions, a catalyst may become deactivated and lose catalyst activity (negative molecular switch response); maintain catalyst activity (no molecular switch response); or become activated and/or increase in catalyst activity (positive molecular switch response). Molecular switch response may be determined by ratio of the difference between catalyst component activity ($A_O$) after exposure to oxygen, then to subsequent polymerization conditions, including activation with an alkyl aluminum compound, and the catalyst component activity ($A_I$) of the mixed catalyst system that has not been exposed to oxygen, under polymerization conditions, including preferably an inert atmosphere; and is represented by the formula: ($A_O$−$A_I$)/$A_I$.

For example, before contact with the molecular switch, under polymerization conditions, the polymerization catalyst comprising a Group 4 or Group 5 transition metal typically produces polymer, giving a unimodal or bimodal molecular weight distribution, as the first polyolefin component. In contrast, the organochromium polymerization catalyst does not appear to produce much polymer.

In embodiments herein, under polymerization conditions where the polymerization catalyst comprising a Group 4 or Group 5 transition metal is active, the organochromium polymerization catalyst has an activity at least 50% less than the activity of the polymerization catalyst comprising a Group 4 or Group 5 transition metal, at least 60% less, at least 70% less, at least 80% less, at least 90% less, or at least 98% less. In an alternate embodiment, the organochromium polymerization catalyst has an activity at least one order less than the activity of the polymerization catalyst comprising a Group 4 or Group 5 transition metal, at least two orders less, at least 3 orders less, at least 5 orders less, or at least 6 orders less. Similarly, under polymerization conditions where the polymerization catalyst comprising a Group 4 or Group 5 transition metal is active, the polymerization catalyst comprising a Group 4 or Group 5 transition metal has an activity at least 50% greater than the activity of the organochromium polymerization catalyst, at least 60% greater, at least 70% greater, at least 80% greater, at least 90% greater, or at least 98% greater. In an alternate embodiment, the organochromium polymerization catalyst has an activity at least one order more than the activity of the polymerization catalyst comprising a Group 4 or Group 5 transition metal, at least two orders more, at least 3 orders more, at least 5 orders more, or at least 6 orders more.

However, after the supported mixed catalyst system has been contacted with the molecular switch, the polymerization catalyst comprising a Group 4 or Group 5 transition metal typically ceases to produce appreciable amounts of polymer. In such embodiments, the polymerization catalyst comprising a Group 4 or Group 5 transition metal is deactivated or quenched by contact with the molecular switch, and does not produce appreciable quantities of additional first polyolefin component. This is observed as a lack of growth of the mode of the first polyolefin component in the GPC trace. Accordingly, for polymerization catalysts comprising a Group 4 or Group 5 transition metal, the $A_O$ is less than the $A_I$. Accordingly, the polymerization catalyst comprising a Group 4 or a Group 5 transition metal has a negative molecular switch response. In embodiments herein, after contact with a molecular switch and under polymerization conditions, the polymerization catalyst comprising a Group 4 or Group 5 transition metal is less active than the organochromium polymerization catalyst. In some embodiments, the polymerization catalyst comprising a Group 4 or Group 5 transition metal is at least 50% less active than the organochromium polymerization catalyst, at least 60% less, at least 70% less, at least 80% less, at least 90% less, or at least 98% less, after contact with the molecular switch. In an alternate embodiment, the catalyst comprising a Group 4 or Group 5 transition metal has an activity at least one order less than the activity of the organochromium polymerization catalyst polymerization, at least two orders less, at least 3 orders less, at least 5 orders less, or at least 6 orders less.

In contrast, after the supported mixed catalyst system has been contacted with the molecular switch, the organochromium polymerization catalyst typically produces increased amounts of polymer. This is observed due to a growth of a mode of an additional polymer component, different in molecular weight than the first polyolefin component, in the GPC trace. Accordingly, for organochromium polymerization catalysts, the $A_O$ is greater than the $A_I$. Accordingly, the organochromium polymerization catalyst has a positive molecular switch response. In embodiments herein, after contact with a molecular switch, preferably comprising oxygen and an alkyl aluminum compound, and under polymerization conditions, the organochromium polymerization catalyst is more active than the polymerization catalyst comprising a Group 4 or Group 5 transition metal. In some embodiments, the organochromium polymerization catalyst is at least 50% more active than the polymerization catalyst comprising a Group 4 or Group 5 transition metal, at least 60% more, at least 70% more, at least 80% more, at least 90% more, or at least 98% more, after contact with the molecular switch. In an alternate embodiment, the organochromium polymerization catalyst has an activity at least one order more than the activity of the polymerization catalyst comprising a Group 4 or Group 5 transition metal, at least two orders more, at least 3 orders more, at least 5 orders more, or at least 6 orders more.

In some embodiments herein, after contact with a molecular switch, under polymerization conditions, the polymerization catalyst comprising a Group 4 or Group 5 transition metal has a negative molecular switch response and the organochromium polymerization catalyst has a positive molecular switch response.

In a preferred embodiment, the polymerization catalyst comprising a Group 4 or Group 5 transition metal is inactive in step (iii) of the polymerization process, and the organochromium compound is inactive in step (i) of the polymerization process. In another preferred embodiment, the polymerization catalyst comprising a Group 4 or Group 5 transition metal is active in step (i) of the polymerization process, and the organochromium compound is active in step (iii) of the polymerization process. In yet another preferred embodiment, the polymerization catalyst comprising a Group 4 or Group 5 transition metal is active in step (i) of the polymerization process and inactive in step (iii). In yet another embodiment, the organochromium compound is inactive in step (i) of the polymerization process and active in step (iii).

In another embodiment, the mixed catalyst system of the present invention comprises: (i) at least one polymerization catalyst comprising a Group 4 or Group 5 transition metal; (ii) an activator; (iii) at least one organochromium polymerization catalyst; and (iv) a support material; wherein under polymerization conditions where the polymerization catalyst comprising a Group 4 or Group 5 transition metal is active, the organochromium polymerization catalyst has an activity at least 50% less than the activity of the polymerization catalyst comprising a Group 4 or Group 5 transition metal; and wherein after contact with a molecular switch, and under polymerization conditions, the organochromium polymerization catalyst is at least 50% more active than the polymerization catalyst comprising a Group 4 or Group 5 transition metal.

This invention further relates to a method of making a mixed catalyst system comprising: (i) contacting a support material with a polymerization catalyst comprising a Group 4 or a Group 5 transition metal and an activator, such that the reactive groups on the support material are titrated, to form a supported polymerization catalyst; (ii) thereafter contacting the supported polymerization catalyst with an organochromium polymerization catalyst to form a supported mixed catalyst system; wherein the organochromium polymerization catalyst and the polymerization catalyst comprising a Group 4 or Group 5 transition metal differ in molecular switch response by at least 50%; and wherein the organochromium polymerization catalyst of the supported mixed catalyst system is less active than the polymerization catalyst comprising a Group 4 or Group 5 transition metal by at least 50%, under polymerization conditions where the polymerization catalyst comprising a Group 4 or Group 5 transition metal is active.

Processes to make multimodal polyolefins, supported catalyst systems, and methods of making the supported catalyst systems are described below.

Polymerization Processes

In embodiments herein, the invention relates to a process comprising: (i) contacting at least one first olefin monomer with a mixed catalyst system, under polymerization conditions; to produce at least a first polyolefin component having a Mw of 5,000 g/mole to 600,000 g/mole; preferably 8,000 g/mole to 400,000 g/mole; or 10,000 g/mole to 300,000 g/mole; wherein the mixed catalyst system comprises: (a) at least one polymerization catalyst comprising a Group 4 or Group 5 transition metal; (b) at least one organochromium polymerization catalyst; (c) an activator; and (d) a support material; (ii) thereafter, contacting the first polyolefin component/mixed catalyst system combination with a molecular switch, preferably comprising oxygen and an alkyl aluminum compound; (iii) contacting the first polyolefin component/ mixed catalyst system combination with at least one second olefin monomer, which may be the same or different as the first olefin monomer, under polymerization conditions; and (iv) obtaining a multimodal polyolefin composition; preferably wherein the activity of the catalyst in step (i) is greater than 2000 lbs of polymer per hour (907 Kg/hr), more preferably greater than 5000 lbs/hr (2268 Kg/hr), and most preferably greater than 10,000 lbs/hr (4540 Kg/hr); and the activity of the mixed catalyst system in step (iii) is greater than 2000 lbs of polymer per hour (907 Kg/hr), more preferably greater than 5000 lbs/hr (2268 Kg/hr), and most preferably greater than 10,000 lbs/hr (4540 Kg/hr).

Processes of this invention can be carried out in any manner known in the art. Any suspension, homogeneous bulk, solution, slurry, or gas phase polymerization process known in the art can be used. Gas phase and slurry polymerization processes are preferred.

The processes of the invention may be batch, semi-batch, or continuous. As used herein, the term "continuous" means a system that operates without interruption or cessation. For example, a continuous process to produce a polymer composition would be one where the reactants are continually introduced into one or more reactors and polymer composition products are continually withdrawn.

In a gas phase polymerization process, a continuous cycle is typically employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.)

In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

A particle form polymerization, i.e., a type of slurry process, can be used wherein the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

The processes of this invention may be conducted in any of glass lined, stainless steel, or similar type reaction equipment. Useful reaction vessels include reactors (including continuous stirred tank reactors, batch reactors, reactive extruder, pipe or pump, continuous flow fixed bed reactors, slurry reactors, fluidized bed reactors, and catalytic distillation reactors). The reaction zone may be fitted with one or more internal and/or external heat exchanger(s) in order to control undue temperature fluctuations.

If the process is conducted in a continuous flow reactor, then the weight hourly space velocity, given in units of $g_m g_c^{-1} h^{-1}$, that is, grams monomer feed ($g_m$) per gram catalyst ($g_c$) per hour (h), will determine the relative quantities of monomer feed to catalyst employed, as well as the residence time in the reactor of the monomer. In a continuous flow reactor, the weight hourly space velocity of the monomer is typically greater than 0.04 $g_m g_c^{-1} h^{-1}$ and preferably, greater than 0.1 $g_m g_c^{-1} h^{-1}$.

Typical polymerization conditions include temperature, pressure, and residence time. In particular embodiments, at least one first olefin monomer is contacted with a mixed catalyst system, under polymerization conditions; to produce at least a first polyolefin component having a Mw of 5,000 g/mole to 600,000 g/mole. In some embodiments, the temperature of the polymerization process may be in the range of from about 0° C. to about 300° C., preferably from about 60° C. to about 280° C., or more preferably from about 70° C. to about 150° C. If the process is conducted in a batch reactor, then the residence time of the olefin monomer and catalyst can be of any duration, provided that the desired polymer products are obtained. Generally, the residence time in a reactor is in the range of from about 15 minutes to about 240 minutes, preferably from about 30 minutes to about 210 minutes, or preferably from about 45 minutes to about 180 minutes. The polymerization reaction pressure can be any pressure that does not adversely affect the polymerization reaction, and may be in the range of from about 0.1 to about 1000 psi (0.7 kPa to 6.9 MPa), preferably from about 20 to about 400 psi (0.14 MPa to 2.8 MPa), or preferably from about 50 to about 250 psi (0.34 MPa to 1.7 MPa).

In preferred embodiments, the reactants (for example, monomer, supported mixed catalyst; optional diluent, etc.) are combined in a reaction vessel at a temperature in the range of from about 0° C. to about 300° C., preferably from about 60° C. to about 280° C., or more preferably from about 70° C. to about 150° C.; a pressure in the range of from about 0.1 to about 1000 psi (0.7 kPa to 6.9 MPa), preferably from about 20 to about 400 psi (0.14 MPa to 2.8 MPa), or preferably from about 50 to about 250 psi (0.34 MPa to 1.7 MPa); and a residence time in the range of from about 15 minutes to about 240 minutes, preferably from about 30 minutes to about 210 minutes, or preferably from about 45 minutes to about 180 minutes.

In certain embodiments, where the olefin is a gaseous olefin, the olefin pressure is greater than 5 psig (34.5 kPa); preferably, greater than 10 psig (68.9 kPa); and more preferably, greater than 45 psig (310 kPa). When a diluent is used with the gaseous olefin, the aforementioned pressure ranges may also be suitably employed as the total pressure of olefin and diluent. Likewise, when a liquid olefin is employed and the process is conducted under an inert gaseous atmosphere, then the aforementioned pressure ranges may be suitably employed for the inert gas pressure.

Suitable diluents/solvents for the process include non-coordinating, inert liquids. Examples include straight and branched-chain hydrocarbons such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, including those that can be found commercially (Isopar™); perhalogenated hydrocarbons such as perfluorinated $C_{4-10}$ alkanes, chlorobenzene, and aromatic and alkylsubstituted aromatic compounds, such as benzene, toluene, mesitylene, and xylene. Suitable diluents/solvents also include aromatic hydrocarbons, such as toluene or xylenes, and chlorinated solvents, such as dichloromethane. In a preferred embodiment, the feed concentration of the monomers for the polymerization is 60 volume % solvent or less, preferably 40 volume % or less, preferably 20 volume % or less, based on the total volume of the feedstream.

Suitable additives to the polymerization process can include one or more scavengers, activators, promoters, chain transfer agents, chain shuttle agents (such as diethyl zinc), modifiers, reducing agents, oxidizing agents, hydrogen, or silanes.

Monomers useful herein include olefins, in particular, ethylene, propylene, butene, pentene, hexane, heptane, octene, nonene, decene, undecene, and dodecane, and isomers thereof. In some embodiments, a single olefin is contacted with the mixed catalyst system, preferably ethylene or propylene. In other embodiments, more than one olefin, preferably two olefins, or preferably three olefins, are contacted with the mixed catalyst system. In particular embodiments, the copolymer may be a ethylene/propylene, ethylene/butene, ethylene/pentene, ethylene/hexane, or ethylene/octene copolymer. In even more particular embodiments, the comonomer content is less than 50 weight %, based on the total weight of the polymer; less than 40 weight %; less than 30 weight %; less than 20 weight %; less than 10 weight %; or less than 5 weight %.

The quantity of supported mixed catalyst that is employed in the process of this invention is any quantity that provides for an operable polymerization reaction. Preferably, the ratio of moles of monomer feed to moles of supported mixed catalyst, based on moles of transition metal, is typically greater than 10:1, preferably greater than 100:1, preferably greater than 1,000:1, preferably greater than 10,000:1, preferably greater than 25,000:1, preferably greater than 50,000:1, preferably greater than 100,000:1. Alternately, the molar ratio of monomer feed to supported mixed catalyst is typically less than 10,000,000:1, preferably less than 1,000,000:1, and more preferably less than 500,000:1.

In a preferred embodiment, from 0.005 nmoles to 500 nmoles, preferably from 0.1 to 250 nmoles, and most preferably from 1 to 50 nmoles of the supported mixed catalyst, based on moles of transition metal, are charged to the reactor per 3 mmoles of olefin monomer charged.

The molecular weight of the polymers may be controlled in a known manner, e.g., by using hydrogen. Molecular weight control is evidenced by an increase in the melt index of the polymer when the molar ratio of hydrogen to monomer olefin in the reactor is increased.

A "reactor" is any container(s) in which a chemical reaction occurs. In some embodiments, the processes of the present invention, that is steps (i) to (iv), are carried out in the same reactor. In other embodiments, steps (i) to (iv) are carried out in different reaction zones in the same reactor. In particular embodiments, steps (i) to (iv) are carried out in a tubular reactor. In preferred embodiments, steps (i) to (iv) are carried out in a gas phase reactor.

In other embodiments, the processes of the present invention are carried out in two or more reactors. Production of polymers in multiple reactors can include several stages in at least two separate polymerization reactors interconnected by a transfer device making it possible to transfer the polymers resulting from the first polymerization reactor into the second reactor. Alternatively, polymerization in multiple reactors can include the manual transfer of polymer from one reactor to subsequent reactors for continued polymerization.

The polymerization conditions in one of the reactors can be different from the polymerization conditions of the other reactors. Such reactors can include any combination, including multiple loop reactors, multiple gas reactors, a combination of loop and gas reactors, a combination of autoclave reactors or solution reactors with gas or loop reactors, multiple solution reactors, or multiple autoclave reactors. Where multiple reactors are used, the oxygen may be introduced into the first reactor before transfer of the first polymer/mixed catalyst composition to the second reactor, during transfer, or into the second reactor.

Typically, in embodiments herein, the reactants (for example, supported mixed catalyst; optional diluent, etc.) are combined in a reaction vessel with olefin monomer, under the polymerization conditions discussed above, to produce a first polyolefin component. After the desired amount of first polyolefin component has been produced, the first polyolefin component/mixed catalyst system combination is contacted with oxygen. Oxygen may be introduced into the process by any manner known in the art. In some embodiments, the reaction is terminated by the removal of the olefin and then the first polyolefin component/mixed catalyst system combination is contacted with a molecular switch.

Molecular Switch

The molecular switch of the present invention has a first component of oxygen, and a second component of an alkyl aluminum compound. A "molecular switch," as used herein, decreases, or switches off, or quenches the activity of the polymerization catalyst comprising a Group 4 or Group 5 transition metal, and increases or switches on the activity of the organochromium polymerization catalyst. In preferred embodiments, the molecular switch comprises a first component of oxygen and a second component of an alkyl aluminum compound. The components of the molecular switch are preferably added to the process sequentially. In preferred embodiments, the oxygen is contacted with the first polyolefin component/mixed catalyst system, and thereafter the alkyl aluminum compound is added under polymerization conditions, including, preferably, an inert atmosphere.

The oxygen is the first component of the molecular switch of the present invention. As used herein, "oxygen" employed may be in the form of molecular oxygen or an oxygen containing medium (gas, liquid, solid), for example an oxygen containing gas, such as air. In preferred embodiments, the molecular switch comprises oxygen in the form of air. The first polyolefin component/mixed catalyst system combination is contacted with oxygen in an amount sufficient to deactivate the polymerization catalyst comprising a Group 4 or Group 5 transition metal and oxygenate the organochromium polymerization catalyst. "Oxygenate" as used herein, means to react with the organochromium polymerization catalyst to produce a precatalyst. A "precatalyst" as used herein, refers to a catalyst compound which is activated by the second component of the molecular switch, the alkyl aluminum compound.

In embodiments herein, the oxygenated organochromium precatalyst is activated by the second component of the molecular switch, the alkyl aluminum compound. In embodiments herein, the alkyl aluminum compounds are represented by the general formulae: $AlR_3$ or $AlR_2H$ in which each R is, independently, a hydrocarbyl radical (preferably alkyl, comprising from 2 to 10 carbon atoms) or a halide. Compounds of the formula $AlR_3$ are preferred. Examples of useful alkyl aluminum compounds include trimethylaluminum, triethylaluminum, triisobutylaluminum, tri-n-hexylaluminum, tri-n-octylaluminum, tri-iso-octylaluminum, triphenylaluminum, tripropylaluminum, diethylaluminum ethoxide, tributylaluminum, diisobutylaluminum hydride, and diethylaluminum chloride, and the like.

The mixed catalyst system of the present invention comprises: (a) at least one polymerization catalyst comprising a Group 4 or Group 5 transition metal; (b) at least one organochromium polymerization catalyst; (c) an activator; and (d) a support material, as discussed below. In some embodiments, the first polyolefin component/mixed catalyst system combination is contacted with at least one equivalent of oxygen per equivalent of activator, at least 1.5 equivalents, at least 2 equivalents, or at least 3 equivalents.

The oxygenated first polyolefin component/mixed catalyst system combination is then contacted with at least one second olefin monomer which may be the same or different as the first olefin monomer, in the presence of an alkyl aluminum compound, under polymerization conditions. The alkyl aluminum compound is the second component of the molecular switch and serves to activate the oxygenated organochromium polymerization precatalyst. At this point, the polymerization catalyst comprising a Group 4 or Group 5 transition metal is at least partially, preferably substantially, inactive and the organochromium polymerization catalyst is at least partially, preferably substantially, active, and produces another polyolefin component, which is different in molecular weight from the first polyolefin component. The amount of second polyolefin component produced may be controlled by the amount of monomer fed to the reactor, the amount of alkyl aluminum compound, and the residence time of the second polymerization. Accordingly, a multimodal MWD polyolefin composition may be produced, with control over each mode of the polyolefin composition.

Multimodal MWD Polyolefin Compositions

Polymer compositions produced by processes and mixed catalyst systems of the present invention are multimodal, having at least a first polyolefin component and another polyolefin component, which differ in molecular weight, preferably such that the GPC trace has more than one peak or inflection points.

Measurements of weight average molecular weight (Mw), number average molecular weight (Mn), and z average molecular weight (Mz) are determined by Gel Permeation Chromatography (GPC) as described in Macromolecules, 2001, Vol. 34, No. 19, pg. 6812, which is fully incorporated herein by reference, including that a High Temperature Size Exclusion Chromatograph (SEC, Waters Alliance 2000), equipped with a differential refractive index detector (DRI), equipped with three Polymer Laboratories PLgel 10 mm Mixed-B columns, is used. The instrument is operated with a flow rate of 1.0 cm3/min, and an injection volume of 300 µL. The various transfer lines, columns, and differential refractometer (the DRI detector) are housed in an oven maintained at 145° C. Polymer solutions are prepared by heating 0.75 to 1.5 mg/mL of polymer in filtered 1,2,4-Trichlorobenzene (TCB) containing 1000 ppm of BHT at 160° C. for 2 hours with continuous agitation. A sample of the polymer containing solution is injected into to the GPC and eluted using filtered 1,2,4-trichlorobenzene (TCB) containing 1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| | Mark-Houwink coefficients | |
|---|---|---|
| Material | K (dL/g) | α |
| PS | $1.75 \times 10^{-4}$ | 0.67 |
| PE | $5.79 \times 10^{-4}$ | 0.695 |

In processes herein, a multimodal polyolefin composition is produced, comprising a first polyolefin component and at least another polyolefin component, different from the first polyolefin component by molecular weight, preferably such that the GPC trace has more than one peak or inflection points. The nature of the multimodal polyolefin composition produced by inventive processes of the present application is illustrated by FIGS. 1 and 2.

FIG. 1 illustrates the MWD of the first polyolefin component from Example 2A (here, polyethylene) obtained from a process using a mixed catalyst system, comprising bis (1-methyl,3-butylcyclopentadienyl)zirconium dichloride and bis (cyclopentadienyl)chromium, before contact with oxygen and an alkyl aluminum compound. The inventors have surprisingly discovered that only one mode is observed even though a mixed catalyst system is used. Example 2A produced a first polyolefin component which is characteristic of those produced by metallocenes, having a low MWD, here 3.1 (See Example 2A, below).

FIG. 2 illustrates MWD of a multimodal polyolefin composition obtained from Example 2B (here, polyethylene) obtained from a process using a mixed catalyst system, comprising bis(1-methyl,3-butylcyclopentadienyl)zirconium dichloride and bis(cyclopentadienyl)chromium, including contact with oxygen and triethyl aluminum. The inventors have surprisingly discovered that another mode is observed, different from the first polyolefin component by molecular weight. Here, the new polyolefin component observed has a higher molecular weight than the first polyolefin component and the lower molecular weight tail, typically attributed to organochromium compounds, is absent. Because of the absence of this low molecular weight tail, the MWD of the multimodal polyolefin composition (Mw/Mn is 4.24, Example 2B, Example Section, below) is unexpectedly narrow, e.g., 4.24 (Example 2B).

In some embodiments, processes herein produce a first polyolefin component having a Mw of 5,000 g/mole to 600,000 g/mole; preferably 8,000 g/mole to 400,000 g/mole; or 10,000 g/mole to 300,000 g/mole. In some embodiments, processes herein produce a first polyolefin component having a MWD of from about 1.1 to about 10, from about 2 to about 8, or from about 2.2 to about 5. In some embodiments, processes herein produce a first polyolefin component having one mode, alternately having two modes. In some embodiments, processes herein produce a first polyolefin component having a Mw of 5,000 g/mole to 600,000 g/mole; preferably 8,000 g/mole to 400,000 g/mole; or 10,000 g/mole to 300,000 g/mole; a MWD of from about 1.1 to about 10, from about 2 to about 8, or from about 2.2 to about 5; and having one mode, alternately having two modes.

In some embodiments, processes herein produce a multimodal polyolefin composition comprising another polyolefin component having a Mw of 500,000 g/mole to 5,000,000 g/mole; preferably 550,000 g/mole to 2,500,000 g/mole; or 600,000 g/mole to 1,000,000 g/mole. In some embodiments, processes herein produce a multimodal polyolefin composition comprising another polyolefin component having a MWD of from about 1.1 to about 10, from about 2 to about 9, or from about 2.2 to about 6. In some embodiments, processes herein produce a multimodal polyolefin composition comprising another polyolefin component having a single mode. In some embodiments, processes herein produce a multimodal polyolefin composition comprising another polyolefin component having a Mw of 500,000 g/mole to 5,000,000 g/mole; preferably 550,000 g/mole to 2,500,000 g/mole; or 600,000 g/mole to 1,000,000 g/mole; a MWD of from about 1.1 to about 10, from about 2 to about 9, or from about 2.2 to about 6; and having a single mode.

In some embodiments, processes herein produce a multimodal polyolefin composition comprising less than 5 weight %, less than 2.5 weight %, or less than 1 weight %, of a component having a molecular weight less than 300,000 g/mole, less than 350,000 g/mole, or less than 375,000 g/mole. The percentage of the multimodal polyolefin composition having a molecular weight less than 300,000 g/mole may be determined using techniques for isolating individual fractions of a sample of the polymeric resin. One such technique is Temperature Rising Elution Fraction (TREF), as described in Wild, et al., J. Poly. Sci., Poly. Phys. Ed., vol. 20, p. 441 (1982) and U.S. Pat. No. 5,008,204, which is incorporated herein by reference. To determine the percentage of the multimodal polyolefin composition having a molecular weight less than 300,000 g/mole, a solubility distribution curve is first generated for the polymer, using data acquired from the TREF technique described above. The solubility distribution curve is a plot of the weight fraction of the copolymer that is solubilized as a function of temperature. From the solubility distribution curve, the percentage of the multimodal polyolefin composition having a molecular weight less than 300,000 g/mole may be determined.

In some embodiments, processes herein produce a multimodal polyolefin composition having at least two modes, or at least three modes.

In some embodiments, processes herein produce a multimodal polyolefin composition comprising (i) a first polyolefin component having a Mw of 5,000 g/mole to 600,000 g/mole; preferably 8,000 g/mole to 400,000 g/mole; or 10,000 g/mole to 300,000 g/mole; a MWD of from about 1.1 to about 10, from about 2 to about 8, or from about 2.2 to about 5; and having one mode, alternately having two modes; and (ii) another polyolefin component having a Mw of 500,000 g/mole to 5,000,000 g/mole; preferably 550,000 g/mole to 2,500,000 g/mole; or 600,000 g/mole to 1,000,000 g/mole; a MWD of from about 1.1 to about 10, from about 2 to about 9, or from about 2.2 to about 6; and having a single mode; wherein the multimodal polyolefin composition: (a) has a MWD of from about 1.1 to about 15, from about 2 to about 12, or from about 2.2 to about 7.5; (b) comprises less than 5 weight %, less than 2.5 weight %, or less than 1 weight % of a component having a molecular weight less than 300,000 g/mole, less than 350,000 g/mole, or less than 375,000 g/mole; and (c) has multimodal molecular weight distribution, preferably having at least two modes, or at least three modes.

A lower molecular weight tail, as described above, is characteristic in polymer obtained using organochromium catalysts or conventional mixed catalysts, such as metallocene/organochromium catalysts, and is often undesirable because the low molecular weight component may lead to poor film appearance, such as the presence of gels. Further, the presence of low molecular weight polyolefins in the multimodal polyolefin composition may lead to die-lip buildup and smoking in on-line operations. The multimodal polyolefin compositions of the present invention, which lack this low molecular weight tail, can be processed into films and pipe on existing equipment, and exhibit good processability in film production or for pipe applications, and may provide film product with a low gel level (excellent FQR). FQR is a qualitative ranking of gel level, ranging from 10 to 60, where 10 FQR indicates no gels and 60 FQR indicates an unacceptably high number of gels. In embodiments herein, multimodal polyolefin compositions of the present invention may have a gel level of less than 20 FQR, 30 FQR, or 40 FQR. The multimodal polyolefin compositions of the present invention also may exhibit reduced tendency towards die-lip buildup and smoking in on-line operations. Accordingly, multimodal polyolefin compositions of the present invention exhibit unexpected advantages over multimodal polyolefins produced using conventional mixed catalysts such as metallocene/organochromium catalysts.

Mixed Catalyst Composition and Components

In the description herein, the catalyst may be described as a catalyst precursor, a pre-catalyst compound, or a transition metal compound, and these terms are used interchangeably. A polymerization catalyst system is a catalyst system that can polymerize monomers to polymer. A "catalyst system" is a combination of at least one catalyst compound, at least one activator, an optional co-activator, and a support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of this invention and the claims thereto, when catalyst compositions are described as comprising neutral stable forms of the components, it is well understood by one of ordinary skill in the art, that the ionic form of the component is the form that reacts with the monomers to produce polymers. For the purposes of this invention and the claims thereto, a "substituted hydrocarbyl" is a radical made of carbon and hydrogen where at least one hydrogen is replaced by a heteroatom. For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The supported mixed catalyst system of the present invention comprises: (i) at least one polymerization catalyst comprising a Group 4 or Group 5 transition metal; (ii) an activator; (iii) at least one organochromium polymerization catalyst; and (iv) a support material; wherein under polymerization conditions where the polymerization catalyst comprising a Group 4 or Group 5 transition metal is active, the organochromium polymerization catalyst has an activity at least 50% less than the activity of the polymerization catalyst comprising a Group 4 or Group 5 transition metal; and wherein after contact with a molecular switch, preferably comprising oxygen and an alkyl aluminum compound, and under polymerization conditions, the organochromium polymerization catalyst is at least 50% more active than the polymerization catalyst comprising a Group 4 or Group 5 transition metal.

Each of (i) the polymerization catalyst comprising a Group 4 or Group 5 transition metal; (ii) the activator; (iii) the organochromium polymerization catalyst; and (iv) the support material, is discussed below.

(i) Polymerization Catalyst Comprising a Group 4 or Group 5 Transition Metal

The present invention provides a supported mixed catalyst composition comprising a polymerization catalyst comprising a Group 4 or Group 5 transition metal; preferably Ti, V, Zr, or Hf; preferably Ti, Zr, or Hf; or preferably Zr or Hf. In some embodiments, the polymerization catalyst comprising a Group 4 or Group 5 transition metal may be a metallocene catalyst. A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof.

Metallocene Catalyst

In some embodiments, the polymerization catalyst comprising a Group 4 or Group 5 transition metal is represented by the formula:

(I);

or

(II);

where M is a Group 4, or 5 transition metal, preferably M is Ti, V, Zr, or Hf; preferably Ti, Zr, or Hf; or preferably Zr or Hf;
the ligands, $L^A$ and $L^B$, are open, acyclic or fused ring(s) or ring system(s), including unsubstituted or substituted, cyclopentadienyl ligands, heteroatom substituted and/or heteroatom containing cyclopentadienyl ligands;
each X is a leaving group;
A* is a bridging group; and
n is 0, 1, 2, or 3.

In one embodiment, $L^A$ and $L^B$ may be any ligand structure capable of π-bonding to M, for example cyclopentadiene, indene, fluorene, phenyl, benzyl, and the like. In another embodiment, $L^A$ and $L^B$ may comprise one or more heteroatoms, for example, nitrogen, silicon, boron, germanium, sulfur, and phosphorous, in combination with carbon atoms to form an open, acyclic, or preferably, a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins, and other polyazomacrocycles. Independently, each $L^A$ and $L^B$ may be the same or different. In one embodiment of Formula (I), only one of either $L^A$ or $L^B$ is present.

Each $L^A$ and $L^B$ may be independently unsubstituted or substituted with at least one R* substituent group, where substituted means that at least one (alternately at least 2, 3, 4, 5, 6, 7, 8, or 9) hydrogen group on $L^A$ and/or $L^B$ (e.g., cyclopentadiene, indene, fluorene, phenyl, benzyl, etc.) is replaced with R*. Non-limiting examples of substituent groups R* include one or more from the group selected from hydrogen, or linear, or branched alkyl radicals, alkenyl radicals, alkynyl radicals, cycloalkyl radicals, aryl radicals, acyl radicals, aryl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, arylamino radicals, or combination thereof. In a preferred embodiment, substituent groups R* have up to 50 non-hydrogen atoms, preferably from 1 to 30 carbon, that may also be substituted with halogens or heteroatoms or the like. Non-limiting examples of alkyl substituents R* include methyl, ethyl, propyl, butyl, pentyl, hexyl, cyclopentyl, cyclohexyl, benzyl or phenyl groups, and the like, including all their isomers, for example, tertiary butyl, isopropyl, and the like. Other hydrocarbyl radicals include fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; and halocarbyl-substituted organometalloid radicals including tris (trifluoromethyl)silyl, methyl-bis(difluoromethyl)silyl, bromomethyldimethylgermyl, and the like; and disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R* include the atoms carbon, silicon, boron, aluminum, nitrogen, phosphorous, oxygen, tin, sulfur, germanium, and the like, including olefins, such as, but not limited to, olefinically unsaturated substituents including vinyl-terminated ligands, for example, but-3-enyl, prop-2-enyl, hex-5-enyl, and the like. Also, in some embodiments, at least two R* groups, preferably two adjacent R groups, are joined to form a ring structure having from 3 to 30 atoms selected from carbon, nitrogen, oxygen, phosphorous, silicon, germanium, aluminum, boron, or a combination thereof. In other embodiments, R* may also be a diradical bonded to L at one end and forming a carbon sigma bond to the metal M. Particularly preferred R* substituent groups include a $C_1$ to $C_{30}$ hydrocarbyl, a heteroatom or heteroatom containing group (preferably methyl, ethyl), propyl (including isopropyl, sec-propyl), butyl (including t-butyl and sec-butyl), neopentyl, cyclopentyl, hexyl, octyl, nonyl, decyl, phenyl, substituted phenyl, benzyl (including substituted benzyl), cyclohexyl, cyclododecyl, norbornyl, and all isomers thereof.

Non-limiting examples of ligands ($L^A$ and $L^B$) include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, boratobenzene ligands and the like, including hydrogenated versions thereof, for example tetrahydroindenyl ligands. Preferably, $L^A$ and $L^B$ are cyclopentadienyl ligands, indenyl ligands, benzindenyl ligands, and/or fluorenyl ligands.

Other ligands may be bonded to the metal M, such as at least one leaving group X. In one embodiment, X is a monoanionic ligand bonded to M. Depending on the oxidation state of the metal, the value for n is 0, 1, 2, or 3 such that Formulae (I) and (II) above represent a neutral ligand metallocene catalyst compound. Non-limiting examples of X leaving groups include weak bases, such as carboxylates, dienes, hydrocarbyl radicals having from 1 to 20 carbon atoms, hydrides or halogens, and the like, or a combination thereof. In another embodiment, two or more Xs form a part of a fused ring or ring system. Other examples of X ligands include those substituents for R*, as described above, and including cyclobutyl, cyclohexyl, heptyl, tolyl, trifluoromethyl, tetramethylene (both X), pentamethylene (both X), methylidene (both X), methoxy, ethoxy, propoxy, phenoxy, bis(N-methylanilide), dimethylamide, dimethylphosphide radicals, and the like. Preferably, X is an alkyl group or a halide. More preferably, X is chlorine, bromine, benzyl, phenyl, or a $C_1$ to $C_{12}$ alkyl group (such as methyl, ethyl, propyl, butyl, hexyl, and octyl).

In Formula (II), the bridging group A* bridges $L^A$ and $L^B$. Non-limiting examples of bridging group A* include bridging groups containing at least one Group 13 to 16 atom, often referred to as a divalent moiety, such as, but not limited to, at least one of a carbon, oxygen, nitrogen, silicon, aluminum, boron, germanium and tin atom or a combination thereof. Preferably, bridging group A* contains a carbon, silicon or germanium atom, most preferably, A* contains at least one silicon atom or at least one carbon atom. The bridging group A* may also contain substituent groups R* as defined above including halogens and iron. Non-limiting examples of bridging group A* may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent R' may join to form a substituted or unsubstituted, saturated, partially unsaturated or aromatic, cyclic or polycyclic substituent. In one embodiment, the bridged metallocene catalyst compounds of Formula (II) have two or more bridging groups A* (EP 664 301 B1). Preferably, A* is a bridging group comprising carbon or silica, such as dialkylsilyl, preferably A* is selected from $CH_2$, $CH_2CH_2$, $CH(CH_3)_2$, $SiMe_2$, $SiPh_2$, $SiMePh$, $Si(CH_2)_3$, $(Ph)_2CH$, $(p-(Et)_3SiPh)_2CH$ and $Si(CH_2)_4$.

In a preferred embodiment, the catalyst compound is represented by Formula (III):

$$L^A(A^*)_m L^B MX_n \qquad (III);$$

where M is zirconium, hafnium, vanadium, or titanium;
the ligands, $L^A$ and $L^B$, are cyclopentadienyl, substituted cyclopentadienyl, indenyl, substituted indenyl, fluorenyl, or substituted fluorenyl;
each X is independently a monoanionic ligand selected from one of hydride; substituted or unsubstituted $C_1$ to $C_{30}$ hydrocarbyl; alkoxide; aryloxide; amide; halide; phosphide; and Group 14 organometalloids; or both Xs together may form an alkylidene or a cyclometallated hydrocarbyl or other dianionic ligand;
A* is a bridging group;
m is 0 or 1; and
n is 0, 1, 2, or 3.

In some embodiments, $L^A$ and $L^B$ may be substituted with substituent groups R", and each group R" is, independently, a $C_1$ to $C_{30}$ hydrocarbyl, where the $C_1$ to $C_{30}$ hydrocarbyl is preferably aliphatic or aromatic. In some embodiments, R" is a $C_1$ to $C_{20}$ hydrocarbyl, $C_1$ to $C_{15}$ hydrocarbyl, $C_4$ to $C_{30}$ hydrocarbyl, $C_4$ to $C_{30}$ hydrocarbyl, $C_1$ to $C_8$ hydrocarbyl and $C_4$ to $C_8$ hydrocarbyl. Non-limiting examples of R" include methyl, ethyl, propyl, butyl, pentyl, hexyl, cyclopentyl, cyclohexyl, benzyl or phenyl groups, and the like.

In some embodiments, where m is 1, A* bridges $L^A$ and $L^B$, and is selected from R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—

CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C=P—CR', and R'$_2$C—PR'—CR'$_2$ where R' is hydrogen or a $C_1$-$C_6$ containing hydrocarbyl, substituted hydrocarbyl, halocarbyl, substituted halocarbyl, silylcarbyl or germylcarbyl substituents.

In another embodiment, the metallocene catalysts represented by Formula (IV) are useful herein.

$$L^A A^* J^* MX_n \qquad (IV)$$

where M is zirconium, hafnium, vanadium, or titanium;
$L^A$ is a substituted or unsubstituted ligand bonded to M; preferentially $L^A$ is cyclopentadienyl, substituted cyclopentadienyl, indenyl, substituted indenyl, fluorenyl, or substituted fluorenyl;
each X is a leaving group bonded to M;
J* is a heteroatom containing ligand bonded to M;
A* is a bridging group;
A* is bonded to J* and $L^A$; and
n is 0, 1, 2, or 3.

In Formula (IV), $L^A$, A* and J* form a fused ring system. J* contains a heteroatom from Group 13 to 16, preferably, nitrogen, boron, sulfur, oxygen, aluminum, silicon, phosphorous, and tin. In some embodiments, J* contains a heteroatom with a coordination number of three from Group 15 or a heteroatom with a coordination number of two from Group 16. Preferably, J* contains a nitrogen, phosphorus, oxygen, or sulfur atom, with nitrogen being most preferred. Examples of these heteroatom-containing ligand metallocene catalyst compounds are described in WO 96/33202; WO 96/34021; WO 97/17379; WO 98/22486; EP-A1-0 874 005; U.S. Pat. Nos. 5,233,049; 5,539,124; 5,554,775; 5,637,660; 5,744,417; 5,756,611; and 5,856,258; all of which are incorporated herein by reference.

In preferred embodiment, the catalyst compound is represented by Formula (V):

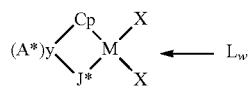

wherein:
M is Zr, Hf or Ti;
Cp is a cyclopentadienyl ring;
J* is a Group 15 or 16 heteroatom or a substituted Group 15 or 16 heteroatom;
each X is independently a monoanionic ligand selected from one of hydride; substituted or unsubstituted $C_1$ to $C_{30}$ hydrocarbyl; alkoxide; aryloxide; amide; halide or phosphide; Group 14 organometalloids; or both Xs together may form an alkylidene or a cyclometallated hydrocarbyl or other dianionic ligand;
y is 0 or 1;
when y=1, A* is a bridging group covalently bonded to both Cp and J;
L is an optional neutral Lewis base other than water, such as an olefin, diolefin, aryne, amine, phosphine, ether or sulfide, e.g., amines, phosphines, ethers, for example, diethylether, tetrahydrofuran, dimethylaniline, aniline, trimethylphosphine, and n-butylamine; and w is a number from 0 to 3.

As used in Formula (V), Cp includes cyclopentadiene ligands and their analogs capable of π-bonding to M, for example, Cp includes indene, and fluorene. In some embodiments, Cp may be substituted with from zero to five substituted groups R*, when y is zero; and from one to four substituted groups R*, when y is one; and each substituted group R* comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals wherein one or more hydrogen atoms may be replaced by one or more of a halogen radical, an amido radical, a phosphido radical, an alkoxy radical, an aryloxy radical or any radical containing a Lewis acidic or basic functionality; $C_1$ to $C_{30}$ hydrocarbyl-substituted metalloid radicals wherein the metalloid is selected from one of Group 14 of the Periodic Table of Elements; halogen radicals; amido radicals; phosphido radicals; alkoxy radicals; or alkylborido radicals; or Cp is a cyclopentadienyl ring in which at least two adjacent R* groups may be joined together and along with the carbon atoms to which they may be attached, form a $C_4$ to $C_{20}$ ring system which may be saturated, partially unsaturated or aromatic, and/or substituted or unsubstituted, the substitutions being selected as one or more R* group, as defined above.

In some embodiments, J* may be substituted with one R' group when J* is a group 15 element, and y is one, or a group 16 element and y is zero; or with two R' groups when J* is a group 15 element and y is zero; or is unsubstituted when J* is a Group 16 element and y is one; and each R' group is, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals wherein one or more hydrogen atoms is replaced by one or more of halogen radicals, amido radicals, phosphido radicals, alkoxy radicals, aryloxy radicals; or alkylborido radicals, preferably all R's are bonded to J* through a primary, secondary, or aromatic carbon atom, and are not directly bonded to a silicon or germanium atom.

A* is as defined above, and in some embodiments, typically comprises at least one Group 13, 14, or 15 element such as carbon, silicon, boron, germanium, nitrogen, or phosphorous with additional substituents R* as defined above, so as to complete the valency of the Group 13, 14 or 15 element(s).

In a preferred embodiment, M is Ti; X is chlorine, bromine, benzyl, phenyl, or a $C_1$ to $C_{12}$ alkyl group (such as methyl, ethyl, propyl, butyl, hexyl, and octyl); y is 1; A* is a bridging group comprising carbon or silica, such as dialkylsilyl, preferably A* is selected from $CH_2$, $CH_2CH_2$, $CH(CH_3)_2$, $SiMe_2$, $SiPh_2$, SiMePh, $Si(CH_2)_3$, $(Ph)_2CH$, $(p-(Et)_3SiPh)_2CH$ and $Si(CH_2)_4$; J* is N—R', where R' is a $C_1$ to $C_{30}$ hydrocarbyl group, such as cyclododecyl, cyclohexyl, butyl (including t-butyl and sec-butyl), benzyl (including substituted benzyl), methyl, ethyl, pentyl, hexyl, neopentyl, cyclopentyl, decyl, propyl (including isopropyl, sec-propyl), norbornyl, and phenyl (including substituted phenyl, such as 3-t-butylphenyl, 2-methylphenyl); and Cp is cyclopentadienyl, substituted cyclopentadienyl, indenyl, substituted indenyl, fluorenyl, or substituted fluorenyl. Two adjacent substitutions may form mononuclear or polynuclear rings.

Other particularly useful polymerization catalysts comprising a Group 4 or Group transition metal include: rac-dimethyl-silyl-bis(4,5,6,7-tetrahydroindenyl)zirconium dichloride or rac-dimethyl-silyl-bis(4,5,6,7-tetrahydroindenyl)zirconium dimethyl, rac-dimethyl-silyl-bis(indenyl)zirconium dichloride or rac-dimethyl-silyl-bis(indenyl)zirconium dimethyl, rac-ethylidene-bis(4,5,6,7-tetrahydroindenyl)zirconium dichloride or rac-ethylidene-bis(4,5,6,7-tetrahydroindenyl)zirconium dimethyl, racethylidene-bis(indenyl)zirconium dichloride or rac-ethylidene-bis(indenyl)zirconium dimethyl, meso-dimethyl-silyl-bis(4,5,6,7-tetrahydroindenyl)zirconium dichloride or meso-dimethyl-silyl-bis(4,5,6,7-tetrahydroindenyl)zirconium dimethyl, meso-dimethyl-silyl-bis(indenyl)zirconium dichloride or meso-dimethyl-silyl-bis(indenyl)zirconium dimethyl, meso-ethylidene-bis(4,5,6,7-tetrahydroindenyl)zirconium dichloride or meso-ethylidene-bis(4,5,6,7-tetrahydroindenyl)zirconium dimethyl, meso-ethylidene-bis(indenyl)zirconium dichloride or meso-ethylidene-bis(indenyl)zirconium dimethyl. Other preferred single-site catalysts include the aforementioned racemic or meso catalysts with different degree of substituted indenyl ligands.

Other preferred metallocenes include the unbridged metallocenes such as bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclopentadienyl)zirconium dimethyl, bis(1-methyl,3-butylcyclopentadienyl)zirconium dichloride, bis(1-methyl,3-butylcyclopentadienyl)zirconium dimethyl, bis(1,2,3-trimethylcyclopentadienyl)zirconium dichloride, bis(1,2,3-trimethylcyclopentadienyl)zirconium dimethyl, bis(1,2,4-trimethylcyclopentadienyl)zirconium dichloride, bis(1,2,4-trimethylcyclopentadienyl)zirconium dimethyl, bis(1,2,3,4-tetramethylcyclopentadienyl)zirconium dichloride, bis(1,2,3,4-tetramethylcyclopentadienyl)zirconium dimethyl, bis(pentamethylcyclo-pentadienyl)zirconium dichloride, bis(pentamethyl-cyclopentadienyl)zirconium dimethyl, bis(propylcyclopentadienyl)hafnium dichloride, bis(propylcyclopentadienyl)hafnium dimethyl and other substituted analogs.

(ii) Activators

It is within the scope of this invention to use a mixed catalyst system comprising an activator, preferably the activator activates the polymerization catalyst comprising a Group 4 or 5 transition metal. In embodiments herein, the activators include alumoxanes, including modified alumoxanes, and non-coordinating anions (NCAs).

Alumoxanes are generally oligomeric compounds containing —Al(R')—O— sub-units, where $R^1$ is an alkyl group; preferably $R^1$ is a methyl, ethyl, propyl, isopropyl, butyl, or isobutyl group; or more preferably $R^1$ is a methyl group. Examples of alumoxanes include methylalumoxane (MAO), modified methylalumoxane (MMAO), ethylalumoxane and isobutylalumoxane. Mixtures of different alumoxanes and modified alumoxanes may also be used. It may be preferable to use a visually clear alumoxane. A cloudy or gelled alumoxane can be filtered to produce a clear solution of clear alumoxane can be decanted from the cloudy solution. Another alumoxane is a modified methyl alumoxane (MMAO) cocatalyst type 3A commercially available under the trade name Modified Methylalumoxane type 3A (Akzo Chemicals, Inc., Chicago, Ill.), covered under U.S. Pat. No. 5,041,584.

The alumoxane component useful as an activator typically is an oligomeric aluminum compound represented by the general formula $(R^x\text{—}Al\text{—}O)_n$, which is a cyclic compound, or $R^x(R^x\text{—}Al\text{—}O)_n AlR^x_2$, which is a linear compound. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, Rx is methyl and "n" is at least 4. Methyl alumoxane and modified methyl alumoxanes are most preferred. For further descriptions see, EP 0 279 586; EP 0 594 218; EP 0 561 476; WO94/10180; and U.S. Pat. Nos. 4,665,208; 4,874,734; 4,908,463; 4,924,018; 4,952,540; 4,968,827; 5,041,584; 5,091,352; 5,103,031; 5,157,137; 5,204,419; 5,206,199; 5,235,081; 5,248,801; 5,329,032; 5,391,793; and 5,416,229.

It is within the scope of this invention to use activators represented by formulae below:

  (X)

or

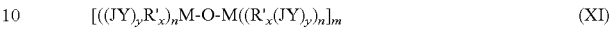  (XI)

or

  (XII)

In Formula (X), n is 1 or 2. In Formula (XI), n is 2, and m is a number from 1 to 10. In Formula (XII), n is a number from 1 to 1000 preferably 1 to 100, more preferably 5 to 50, and even more preferably 5-25. (x+y)=the valence of M in Formula (X). (x+y)=the valence of M-1 in Formula (XI). (x+y)=valence of M-2 in Formula (XII).

In Formulae (X), (XI), and (XII), M is a Group 13 atom, preferably boron or aluminum, and more preferably aluminum. (JY) represents a heterocyclic ligand attached to M. In (JY), the Y represents a heterocyclic ligand and J represents at least one heteroatom contained in ligand JY. M may be bonded to any atom contained in Y, but is preferably bonded to heteroatom J. Preferably, J is an atom selected from Group 15 or 16, more preferably J is nitrogen, oxygen, or sulfur, and most preferably J is nitrogen. Non-limiting examples of (JY) include pyrrolyl, imidazolyl, pyrazolyl, pyrrolidinyl, purinyl, carbazolyl, and indolyl groups.

The heterocyclic ligand (JY) may be unsubstituted or substituted with one or a combination of substituent groups. Examples of suitably substituents include hydrogen, halogen, linear or branched alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. The substituent groups may also be substituted with halogens, particularly fluorine, or heteroatoms, or the like.

Non-limiting examples of substituents include methyl, ethyl, propyl, butyl, pentyl, hexyl, cyclopentyl, cyclohexyl, benzyl or phenyl groups, and the like, including all their isomers, for example, tertiary butyl, isopropyl, and the like. Other examples of substituents include fluoromethyl, fluoroethyl, difluoroethyl, iodopropyl, bromohexyl, and chlorobenzyl.

Preferably, one or more positions on the heterocyclic ligand (JY) is substituted with a halogen atom or a halogen atom containing group, preferably the halogen is chlorine, bromine or fluorine, more preferably bromine or fluorine, and most preferably fluorine. Even more preferably, the substituent is a fluorine atom or a fluorinated aryl group, such as a fluorinated phenyl group.

Each R' is independently a substituent group bonded to M. Non-limiting examples of substituent R' groups include hydrogen, linear or branched alkyl or alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic alkylene radicals, or combination thereof. Each R' may be a methyl, ethyl, propyl, butyl, pentyl, hexyl, cyclopentyl, cyclohexyl, benzyl or phenyl group, including all their isomers, for example tertiary butyl, isopropyl, and the like. Other suitable R' substituents may include hydrocarbyl radicals, such as fluoromethyl, fluoroethyl, difluoroethyl, iodopropyl, bromohexyl, chlorobenzyl; hydrocarbyl substituted organometalloid radicals including trimethylsilyl, trimethylgermyl, methyldiethylsilyl, and the like; halocarbyl-substituted organometalloid radicals including tris(trifluoromethyl)-silyl, methyl-bis(difluoromethyl)silyl, bromomethyldimethylgermyl, and the like; disubstituted boron radicals including dimethylboron, for example; disubstituted pnictogen radicals including dimethylamine, dimethylphosphine, diphenylamine, methylphenylphosphine; and chalcogen radicals including methoxy, ethoxy, propoxy, phenoxy, methylsulfide, and ethylsulfide.

Other R' substituents may include the atoms carbon, silicon, boron, aluminum, nitrogen, phosphorous, oxygen, tin, sulfur, or germanium, and the like. Substituent R' groups also include olefins, such as, but not limited to, olefinically unsaturated substituents including vinyl-terminated ligands, for example but-3-enyl, prop-2-enyl, hex-5-enyl, and the like. Also, at least two R' groups, preferably two adjacent R' groups, may be joined to form a ring structure having from 3 to 30 atoms selected from carbon, nitrogen, oxygen, phosphorous, silicon, germanium, aluminum, boron, or a combination thereof. Also, a substituent group R' such as 1-butanyl may form a carbon bond to the metal M. In one embodiment, each R' is a substituted or unsubstituted alkyl group and/or a substituted or unsubstituted aryl group, and preferably each R' is an alkyl group containing 1 to 30 carbon atoms.

In a particular embodiment, in Formulae (X), (XI), or (XII), M is Al or B, preferably Al, J is a nitrogen atom contained in heterocyclic ligand Y, and preferably (JY) is a substituted or unsubstituted indolyl group where the substituents are preferably hydrogen, halogen, an alkyl group, a halogenated or partially halogenated alkyl group, an aryl group, a halogenated or partially halogenated aryl group, an aryl substituted alkyl group, a halogenated or partially halogenated aryl substituted alkyl group, or combinations thereof, preferably J is bound to M, and R' a substituted or unsubstituted alkyl group and/or a substituted or unsubstituted aryl group, preferably an alkyl group containing 1 to 30 carbon atoms.

In another particular embodiment, in Formulae (X), (XI), or (XII), M is Al or B, preferably Al, J is a nitrogen atom bonded to M and contained in a heterocyclic ligand Y where the heterocyclic ligand (JY) is an unsubstituted heterocyclic ligand. In another embodiment, one or more positions on the heterocyclic ligand is substituted with chlorine, bromine, and/or fluorine or with chlorine, bromine and/or fluorine containing groups, more preferably with fluorine or fluorine containing groups, and R' is a substituted or unsubstituted alkyl group and/or a substituted or unsubstituted aryl group, preferably an alkyl group containing 1 to 30 carbon atoms. In another embodiment, (JY) is a perhalogenated ligand.

In another particular embodiment, in Formulae (X), (XI), or (XII), M is Al or B, preferably Al, J is a nitrogen atom bonded to M and contained in a heterocyclic ligand Y where the heterocyclic ligand (JY) is an unsubstituted heterocyclic ligand. In another embodiment, one or more positions on the heterocyclic group is substituted with a halogen such as chlorine, bromine and/or fluorine atoms, or with a halogen atom, such as a chlorine, bromine, and/or fluorine containing groups. More preferably the heterocyclic group is substituted with fluorine or fluorine containing groups. In another embodiment, at least one R' is bonded to a support material, preferably a silica support material.

The minimum activator-to-transition metal (polymerization catalyst comprising a Group 4 or Group 5 transition metal) ratio is a 1:1 molar ratio. Alternate preferred ratios include up to 5000:1, preferably up to 500:1, preferably up to 200:1, preferably up to 100:1, or preferably from 1:1 to 50:1.

Other preferred activators are NCA activators. For purposes of this invention and the claims thereto, "non-coordinating anion" (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of NCAs comprises stoichiometric activators, which can be either neutral or ionic. The terms "ionic activator," and "stoichiometric ionic activator" can be used interchangeably. Likewise, the terms "neutral stoichiometric activator" and "Lewis acid activator" can also be used interchangeably.

It is also within the scope of this invention to use an ionizing or stoichiometric activator, neutral or ionic non-coordinating anion (as defined in U.S. Patent Publication No. 2009-0318644) such as tri (n-butyl) ammonium tetrakis (pentafluorophenyl)borate, a tris perfluorophenyl boron metalloid precursor, or a tris perfluoronapthyl boron metalloid precursor, polyhalogenated heteroborane anions (WO 98/43983), boric acid (U.S. Pat. No. 5,942,459), or a combination thereof.

Preferably the activator is N,N-dimethylanilinium tetrakis (perfluoronapthyl) borate, N,N-dimethylanilinium tetrakis (perfluorobiphenyl)borate, N,N-dimethylanilinium tetrakis (3,5-bis(trifluoromethyl)phenyl)borate, triphenylcarbeniumtetrakis(perfluoronapthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, or N,N-dimethylanilinium tetrakis(pentafluorophenyl)borate. The more preferred activator is N,N-dimethylanilinium tetrakis (pentafluorophenyl)borate. For additional activators useful herein, please see U.S. Patent Publication No. 2009-0318644. Metal oxide support bound activators, such as those disclosed in WO/1996/004319, are also useful in embodiments herein.

The typical NCA activator-to-transition metal (total moles of transition metal in mixed catalyst system, that is sum of the number of moles of Group 4 or Group 5 transition metal and chromium) ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

(iii) Organochromium Polymerization Catalysts

Any organochromium polymerization catalyst may be used. Some organochromium polymerization catalysts useful in the present invention have one of the following formulae:

(i) $CrR_n$, where R is a $C_1$ to $C_{20}$ hydrocarbyl group; and where n is selected from 2, 3, and 4;

or (ii) $CrL_AL_B$, where $L_A$ and $L_B$ are independently selected from cyclopentadienyl, substituted cyclopentadienyl, indenyl, substituted indenyl, fluorenyl, or substituted fluorenyl;

or (iii) $Cr(XR_n)_m$, where each X is, independently, N, O, P or S, preferably N; each n is independently 1 or 2; m is 1 or 2; and each R is, independently, an alkyl group, a substituted alkyl group, an aryl group, or a substituted aryl group, provided at least one R group is an aryl or substituted aryl group; preferably each R is selected from the group consisting of substituted or unsubstituted phenyl, naphthyl, biphenyl, diphenylether, tolyl, or benzophenonephenyl; more preferably each R group is selected from the group consisting of napthyl, phenyl, biphenyl, fluorophenyl, and tolyl.

Examples of useful organochromium polymerization catalysts include: bisbenzene chromium(0); dicumene chromium (0); bis(mesitylene chromium(0); biscyclopentadienylchromium (chromocene); bis(methylcyclopentadienyl)chromium (II); bis(1,3-bis(trimethylsilyl)allyl)chromium(II); bis (trimethylsilylmethyl)chromium(II); bis(2,5-dimethylpentadienyl)chromium(II); ((tetramethylcyclopentadienyl)(t-butylamino) dimethylsilyl) (trimethylsilyl-methyl)chromium(II); diallyl chromium(II); (pentamethyl cyclopentadienyl)bis(benzyl)chromium(II) pyridine adduct; triallyl chromium(III); tris(bis(trimethylsilyl)methyl)chromium(III); (pentamethylcyclopentadienyl) bis(trimethylsilyl methyl)chromium(III); tetraallylchromium(IV); tetramethylchromium(IV); tetrakis(benzyl) chromium(IV); tetrakis-neopentyl chromium(IV), tetrakis (trimethylsilylmethyl)chromium(IV); tetrakis(isopropyl) chromium(IV); tetrakis(2-phenyl-2-methylpropyl) chromium(IV); or any combination thereof.

Exemplary organochromium polymerization catalysts useful in this invention also include, the following compounds: $(\eta^6-C_6H_6)Cr(CO)_3$; $[(\eta^5-C_5H_5)Cr(CO)_3]_2$; $Cr(t-butyl)_4$; $Cr(CH_2CPh_3)_4$ (where Ph=phenyl); $Cr(MeC_6H_5)_2$ (where Me=methyl); $Cr(Me_2C_6H_4)_2$; $Cr(Me_3C_6H_3)_2$; $Cr(C_6Me_6)_2$; $Cr(\eta^6-naphthalene)_2$; regioisomers and stereoisomers thereof; or any combination thereof. In one aspect of the present invention, organochromium polymerization catalysts include, dicumene chromium(0), bisbenzene chromium(0), and chromocene. In another aspect of the present invention, the organochromium polymerization catalysts include Cr(III) $(N(SiMe_3)_2)_3$, $Cr(III)(NPh_2)_3$, and $Cr(III)(N(SiMe_3)_2)_2$.

(iv) Support Materials

In embodiments herein, the mixed catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 m²/g, pore volume in the range of from about 0.1 to about 4.0 cc/g and average particle size in the range of from about 5 to about 500 μm. More preferably, the surface area of the support material is in the range of from about 50 to about 500 m²/g, pore volume of from about 0.5 to about 3.5 cc/g and average particle size of from about 10 to about 200 μm. Most preferably the surface area of the support material is in the range is from about 100 to about 400 m²/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m²/gm; pore volume of 1.65 cm³/gm), and is marketed under the tradenames of DAVISON 952 or DAVISON 955 by the Davison Chemical Division of W.R. Grace and Company. In other embodiments, DAVIDSON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising a Group 4 or Group 5 transition metal and at least one activator, as discussed above.

Methods of Making a Supported Mixed Catalyst System

This invention encompasses a mixed catalyst composition comprising the contact product of (i) a polymerization catalyst comprising a Group 4 or Group 5 transition metal, (ii) an activator, (iii) an organochromium polymerization catalyst, and (iv) a support material, each component of which was discussed above.

This invention further relates to a method of making a supported mixed catalyst system comprising: (i) contacting a support material with a polymerization catalyst comprising a Group 4 or Group 5 transition metal and an activator, such that the reactive groups on the support material are titrated, to form a supported polymerization catalyst; (ii) thereafter contacting the supported polymerization catalyst with an organochromium polymerization catalyst to form a supported mixed catalyst system; wherein the organochromium polymerization catalyst and polymerization catalyst comprising a Group 4 or Group 5 transition metal differ in molecular switch response by at least 50%; and wherein the organochromium polymerization catalyst of the supported mixed catalyst system is less active than the polymerization catalyst comprising a Group 4 or Group 5 transition metal by at least 50%, under polymerization conditions where the polymerization catalyst comprising a Group 4 or Group 5 transition metal is active.

In embodiments herein, the support material is contacted with a solution of a polymerization catalyst comprising a Group 4 or Group 5 transition metal and an activator, such that the reactive groups on the support material are titrated, to form a supported polymerization catalyst. The period of time for contact between the polymerization catalyst comprising a Group 4 or Group 5 transition metal, an activator compound, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the polymerization catalyst comprising a Group 4 or Group 5 transition metal and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of Al to the hydroxyl groups (OH) on the silica is about 0.5:1 to about 4:1, preferably about 0.8:1 to about 3:1, more preferably about 0.9:1 to about 2:1 and most preferably about 1:1. The amount of Al on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

The support material, having reactive surface groups, typically hydroxyl groups, is slurried in a non-polar solvent and the resulting slurry is contacted with a solution of a polymerization catalyst comprising a Group 4 or Group 5 transition metal and an activator. The slurry of the support material in the solvent is prepared by introducing the support material into the solvent, and heating the mixture to about 0° C. to about 70° C., preferably to about 25° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the polymerization catalyst comprising a Group 4 or Group 5 transition metal, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed.

After the supported polymerization catalyst is formed, the supported polymerization catalyst is thereafter contacted with the first organochromium polymerization catalyst to form a supported mixed catalyst system. The period of time for contact between the supported polymerization catalyst and the organochromium catalyst typically ranges from about 0.5 hours to about 24 hours, from about 2 hours to about 16 hours, or from about 4 hours to about 8 hours. During the contact time, the mixture may be heated from between about 10° C. to about 200° C., from about 20° C. to about 95° C., preferably the mixture is not heated during the contacting time.

The molar ratio of the polymerization catalyst comprising a Group 4 or a Group 5 transition metal to the organochromium polymerization catalyst may be from about 100:1 to about 1:100, from about 10:1 to about 1:10, or from about 5:1 to about 1:5. The molar ratio of the polymerization catalyst comprising a Group 4 or a Group 5 transition metal to the activator compound may be from about 1:100 to about 1:1, from about 1:100 to about 1:5, and from about 1:50 to about 1:10.

In some embodiments, the weight ratio of the polymerization catalyst comprising a Group 4 or a Group 5 transition metal to the solid support material may be from about 10:1 to about 0.0001:1, from about 1:1 to about 0.001:1, or from about 0.1:1 to about 0.001:1. The weight ratio of the support material to the activator compound may range from about 1:10 to about 100:1, from about 1:1 to about 100:1, or from about 1:1 to about 10:1.

It is advantageously within the scope of this invention to use a pre-prepared or a commercially available supported polymerization catalyst comprising a Group 4 or Group 5 transition metal and an activator to form the mixed catalyst systems of the present invention, as long the reactive groups on the support material have been titrated. In such embodiments, the pre-prepared or commercially available supported polymerization catalyst is contacted with the first organochromium polymerization catalyst to form a mixed catalyst system. The period of time for contact between the pre-prepared or commercially available supported polymerization catalyst and the organochromium catalyst typically ranges from about 0.5 hours to about 24 hours, from about 2 hours to about 16 hours, or from about 4 hours to about 8 hours. During the contact time, the mixture may be heated from between about 10° C. to about 200° C., from about 20° C. to about 95° C., preferably the mixture is not heated during the contacting time. Using a pre-prepared or a commercially available supported polymerization catalyst is advantageous because it allows easier screening of mixed catalysts, is more efficient, and saves time.

In particular embodiments, this invention further relates to a method of making a supported mixed catalyst system comprising: (i) contacting a support material with a polymerization catalyst comprising a Group 4 or Group 5 transition metal and an activator, such that the weight ratio of the polymerization catalyst comprising a Group 4 or a Group 5 transition metal to the solid support material is in the range of from about 10:1 to about 0.0001:1, from about 1:1 to about 0.001:1, or from about 0.1:1 to about 0.001:1; and the weight ratio of the support material to the activator compound is in the range of from about 1:10 to about 100:1, from about 1:1 to about 100:1, or from about 1:1 to about 10:1 such that the reactive groups on the support material are titrated, for a time period of from about 0.5 hours to about 24 hours, from about 2 hours to about 16 hours, or from about 4 hours to about 8 hours; at a temperature from between about 10° C. to about 200° C., from about 20° C. to about 95° C., preferably the mixture is not heated during the contacting time to form a supported polymerization catalyst; and (ii) thereafter contacting the supported polymerization catalyst with an organochromium polymerization catalyst for a time period of from about 0.5 hours to about 24 hours, from about 2 hours to about 16 hours, or from about 4 hours to about 8 hours; at a temperature from between about 10° C. to about 200° C., from about 20° C. to about 95° C., preferably the mixture is not heated during the contacting time, to form a supported mixed catalyst system; wherein the organochromium polymerization catalyst and polymerization catalyst comprising a Group 4 or Group 5 transition metal differ in molecular switch response by at least 50%; and wherein the organochromium polymerization catalyst of the supported mixed catalyst system is less active than the polymerization catalyst comprising a Group 4 or Group 5 transition metal by at least 50%, under polymerization conditions where the polymerization catalyst comprising a Group 4 or Group 5 transition metal is active.

In another embodiment, this invention relates to:

1. A process to make a multimodal polyolefin composition comprising:
   (i) contacting at least one first olefin monomer with a mixed catalyst system, under polymerization conditions; to produce at least a first polyolefin component having a Mw of 5,000 g/mol to 600,000 g/mol, preferably 8,000 g/mole to 400,000 g/mole; or 10,000 g/mole to 300,000 g/mole; wherein the mixed catalyst system comprises:
      (a) at least one polymerization catalyst comprising a Group 4 or Group 5 transition metal; preferably zirconium, hafnium, titanium, or vanadium; preferably zirconium, hafnium, or titanium; preferably zirconium or hafnium; or more preferably a metallocene represented by the formula:

$$L^A L^B MX_n; \qquad (i)$$

or $$L^A A^* L^B MX_n; \qquad (ii)$$

where M is a Group 4 or 5 transition metal;
      the ligands, $L^A$ and $L^B$, are open, acyclic or fused ring(s) or ring system(s), including unsubstituted or substituted, cyclopentadienyl ligands, heteroatom substituted and/or heteroatom containing cyclopentadienyl ligands;
      each X is a leaving group;
      A* is a bridging group; and
      n is 0, 1, 2, or 3.;
   (b) at least one organochromium polymerization catalyst represented by the formula:

$$CrR_n; \qquad (i)$$

where R is a $C_1$ to $C_{20}$ hydrocarbyl group; and
      where n is selected from 2, 3, and 4;
      or $$CrL_A L_B; \qquad (ii)$$

where $L_A$ and $L_B$ are independently selected from cyclopentadienyl, substituted cyclopentadienyl, indenyl, substituted indenyl, fluorenyl, or substituted fluorenyl;
      or $$Cr(XR_n)_m; \qquad (iii)$$

where each X is, independently, N, O, P, or S, preferably N;
      each n is independently 1 or 2;
      m is 1 or 2; and each R is, independently, an alkyl group, a substituted alkyl group, an aryl group, or a substituted aryl group, provided at least one R group is an aryl or substituted aryl group.;
   (c) an activator, preferably an alumoxane; and
   (d) a support material;
   (ii) thereafter, contacting the first polyolefin component/mixed catalyst system combination with a molecular switch, preferably comprising oxygen and an alkyl aluminum compound, represented by the formulae $AlR_3$ or $AlR_2H$; preferably oxygen in the form of air; and
   (iii) contacting the first polyolefin component/mixed catalyst system combination with at least one second olefin monomer, which may be the same or different, under polymerization conditions; and
   (iv) obtaining a multimodal polyolefin composition, the multimodal polyolefin composition optionally having:
      (a) a first polyolefin component having a Mw of 5,000 g/mol to 600,000 g/mol, preferably 8,000 g/mole to 400,000 g/mole; or 10,000 g/mole to 300,000 g/mole; a Mw/Mn of greater than 1 to about 10; and having at least one mode; and
      (b) another polyolefin component; and
      wherein the multimodal polyolefin composition:
         (i) has a MWD of greater than 1 to about 15;
         (ii) comprises less than 5 weight %, of a component having a molecular weight less than 300,000 g/mole; and
         (iii) has a multimodal molecular weight distribution, having preferably two modes, or preferably three modes.

2. The process of paragraph 1, wherein under polymerization conditions for step (i), the polymerization catalyst comprising a Group 4 or Group 5 transition metal is active and the organochromium polymerization catalyst has an activity at least 50% less than the activity of the polymerization catalyst comprising a Group 4 or Group 5 transition metal.

3. The process of paragraphs 1 and 2, wherein after contact with a molecular switch and under polymerization conditions for step (iii), the organochromium polymerization catalyst has an activity at least 50% greater than the activity of the polymerization catalyst comprising a Group 4 or Group 5 transition metal.

4. The process of paragraphs 1 to 3, wherein the polymerization catalyst comprising a Group 4 or Group 5 transition metal is deactivated by contact with the molecular switch, and does not produce measureable amounts of additional first polyolefin component.

5. The process of paragraphs 1 to 4, wherein the polymerization catalyst comprising a Group 4 or Group 5 transition metal has a negative molecular switch response and the organochromium polymerization catalyst has a positive molecular switch response.

6. The process of paragraphs 1 to 5, wherein steps (i) to (iv) are carried out in a single reactor.

7. The process of paragraphs 1 to 6, wherein the oxygen and the alkyl aluminum components of the molecular switch are added sequentially.

8. The process of paragraphs 1 to 7, wherein steps (i) to (iv) are carried out in a gas phase reactor.

9. A mixed catalyst system useful in any of paragraphs 1 to 8, wherein, under polymerization conditions of step (i), the polymerization catalyst comprising a Group 4 or Group 5 transition metal is active and the organochromium polymerization catalyst has an activity at least 50% less than the activity of the polymerization catalyst comprising a Group 4 or Group 5 transition metal; and wherein, after contact with a molecular switch (preferably the molecular switch comprises oxygen and an alkyl aluminum compound) and under polymerization conditions of step (iii), the organochromium polymerization catalyst has an activity at least 50% greater than the activity of the polymerization catalyst comprising a Group 4 or Group 5 transition metal.

10. A method of making the supported mixed catalyst system of claim 9 comprising:
   (i) contacting the support material with the polymerization catalyst comprising a Group 4 or a Group 5 transition metal and the activator, such that the reactive groups on the support material are titrated, to form a supported polymerization catalyst;
   (ii) thereafter contacting the supported polymerization catalyst with the organochromium polymerization catalyst to form a supported mixed catalyst system;
   wherein the organochromium polymerization catalyst and polymerization catalyst comprising a Group 4 or Group 5 transition metal differ in molecular switch response by at least 50%; and
   wherein the organochromium polymerization catalyst of the supported mixed catalyst system is less active than the polymerization catalyst comprising a Group 4 or Group 5 transition metal by at least 50%, under polymerization conditions of step (i).

EXAMPLES

Product Characterization

Polymer products were analyzed using a Waters Alliance GPC 2000 Series. Mw, Mn, and MWD data were obtained using trichlorobenzene (TCB) as the solvent, with a flow rate of 1 mL/min at a temperature of 140° C. 2,6-di-tert-butyl-4-methylphenol (BHT) at a concentration of 1.0 g/L was used as a stabilizer in the TCB. An injection volume of 220 L was used with a nominal polymer concentration of 0.3 g/L (at room temperature). Dissolution of the sample in stabilized TCB was carried out by heating at 160° C. to 170° C. for 20 hours with occasional gentle agitation. Two Waters HT-6E columns (7.8×300 mm) were used. The columns were calibrated with a broad linear polyethylene standard (Marlex™ BHB 5003 resin) for which the molecular weight had been determined.

All molecular weights reported are in units of g/mole, unless otherwise stated.

Materials

Bis(cyclopentadienyl)chromium was purchased from Strem Chemicals (Newburyport, Mass.) and was used as received. A 30 wt % methyl aluminoxane (MAO) in toluene solution and bis(1-methyl, 3-butyl cyclopentadienyl)zirconium dichloride were purchased from Albemarle (Baton Rouge, La.) and was used as received. Triethylaluminum and triisobutylaluminum were purchased from AkzoNobel (Chicago, Ill.) and used as received. Toluene was purchased from Sigma Aldrich (St. Louis, Mo.) and dried with previously calcined alumina beads.

Catalyst System Synthesis

Catalyst 1:

Bis(cyclopentadienyl)chromium (10 mgs) was combined with 1.0 grams of silica (Grace Davidson 948, previously calcined to 600° C. for 72 hours) in a toluene slurry (10 mls). After one hour the red solution became colorless as the chromocene reacted with the silica. A solution containing 16 mgs of bis(1-methyl, 3-butyl cyclopentadienyl) zirconium dichloride and 1.6 grams of 30 wt % MAO solution in toluene was added to the slurry. The slurry was allowed to sit at room temperature for two hours. After two hours, the supported catalyst was filtered and dried under vacuum.

Catalyst 2:

A solution containing 16 mgs of bis(1-methyl, 3-butyl cyclopentadienyl) zirconium dichloride and 1.6 grams of 30 wt % MAO solution in toluene was added to a slurry of 1.0 grams of silica (Grace Davidson 948, previously calcined to 600° C. for 72 hours) in toluene. The slurry was allowed to sit at room temperature for two hours. After two hours, bis(cyclopentadienyl)chromium (8 mgs) was added. The slurry was allowed to sit at room temperature overnight. The supported catalyst was filtered and dried under vacuum.

Polymerizations

Example 1

In a nitrogen-purged glove box, 17 mgs of Catalyst 1 (above) was placed in a 75 mL Parr 4740 stainless steel autoclave with 4.0 grams of pentane. Triisobutylaluminum (TIBAL, 20 mgs) was added to the reactor. The reactor was pressured up to 200 psi with ethylene, placed in a 85° C. oil bath, and stirred for 35 minutes. The polymerization yielded 1.1 grams of polyethylene resin, 250 mgs of which was exposed to air.

The polyethylene resin (250 mgs) after exposure to air was placed in the Parr reactor with 30 mgs of triethylaluminum (TEAl) and pressurized to 200 psi ethylene at 85° C. After 12 hours, the reaction yielded 620 mgs of polyethylene, an increase of 0.590 mgs.

Example 2

Example 2A

In a nitrogen-purged glove box, a solution of 20 mg of Catalyst 2 in 5 mL pentane was added to a 75 mL Parr 4740 stainless steel autoclave. Two pipetted drops of TIBAL were then added and the reactor sealed and pressured to 200 psi (1.38 MPa) with ethylene. The reactor was then placed in an oil bath heated to 85° C. for 45 minutes. Upon opening the reactor, 0.875 g of fine white polyethylene granules was obtained. Polymer characterization: Mn=127,692; Mw=395,957; Mw/Mn=3.1 (See FIG. 1 for GPC trace).

Example 2B

Then, 0.409 g of the polyethylene from Example 2A was placed in a vial, removed from the drybox and exposed to air. In a second vial, 3 pipette drops of TEAl were added and the vial placed inside the Parr autoclave. The vial containing the polymer was placed above this vial containing the TEAL. The reactor was then sealed and pressured to 200 psi (1.38 MPa) with ethylene, and placed in an oil bath at 85° C. for 45 minutes. This yielded 0.637 g of polymer granules, an increase of 0.228 g. Polymer characterization: Mn=126,258; Mw=535,110; Mw/Mn=4.24 (See FIG. 2 for GPC trace).

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefore.

We claim:

1. A process to make a multimodal polyolefin composition comprising:
   (i) contacting at least one first olefin monomer with a mixed catalyst system, under polymerization conditions, to produce at least a first polyolefin component having a Mw of 5,000 g/mol to 600,000 g/mol, wherein the mixed catalyst system comprises:
      (a) at least one polymerization catalyst comprising a Group 4 or Group 5 transition metal;
      (b) at least one organochromium polymerization catalyst;
      (c) an activator; and
      (d) a support material;
   (ii) thereafter, contacting the first polyolefin component/mixed catalyst system combination with a molecular switch;
   (iii) contacting the first polyolefin component/mixed catalyst system combination with at least one second olefin monomer, which may be the same or different as the first olefin monomer, under polymerization conditions; and
   (iv) obtaining a multimodal polyolefin composition.

2. The process of claim 1, wherein under the polymerization conditions of step (i), the organochromium polymerization catalyst has an activity at least 50% less than the activity of the polymerization catalyst comprising a Group 4 or Group 5 transition metal.

3. The process of claim 1, wherein the molecular switch comprises oxygen and an alkyl aluminum compound.

4. The process of claim 1, wherein under the polymerization conditions of step (iii), the organochromium polymerization catalyst has an activity at least 50% greater than the activity of the polymerization catalyst comprising a Group 4 or Group 5 transition metal.

5. The process of claim 1, wherein the polymerization catalyst comprising a Group 4 or Group 5 transition metal is at least partially deactivated by contact with the molecular switch, and does not produce measurable amounts of additional first polyolefin component.

6. The process of claim 1, wherein the polymerization catalyst comprising a Group 4 or Group 5 transition metal has a negative molecular switch response and the organochromium polymerization catalyst has a positive molecular switch response.

7. The process of claim 1, wherein the activator is an alumoxane.

8. The process of claim 3, wherein the alkyl aluminum compound is represented by the formula: $AlR_3$ or $AlR_2H$, wherein each R is, independently, a hydrocarbyl radical comprising from 2 to 10 carbon atoms, or a halide.

9. The process of claim 1, wherein the polymerization catalyst comprising a Group 4 or Group 5 transition metal comprises a transition metal selected from zirconium, hafnium, titanium, or vanadium.

10. The process of claim 1, wherein the catalyst comprising a Group 4 or Group 5 transition metal comprises a metallocene represented by the formula:

$$L^A L^B M X_n; \quad (i)$$

or $$L^A A^* L^B M X_n; \quad (ii)$$

where M is a Group 4 or 5 transition metal;

the ligands, $L^A$ and $L^B$, are open, acyclic or fused ring(s) or ring system(s), including unsubstituted or substituted, cyclopentadienyl ligands, heteroatom substituted and/or heteroatom containing cyclopentadienyl ligands;

each X is a leaving group;

A* is a bridging group; and n is 0, 1, 2, or 3.

11. The process of claim 1, wherein the organochromium polymerization catalyst is represented by the formula:

$$CrR_n; \quad (i)$$

where R is a $C_1$ to $C_{20}$ hydrocarbyl group; and where n is selected from 2, 3, and 4;

or $$CrL_A L_B; \quad (ii)$$

where $L_A$ and $L_B$ are independently selected from cyclopentadienyl, substituted cyclopentadienyl, indenyl, substituted indenyl, fluorenyl, or substituted fluorenyl;

or $$Cr(XR_n)_m; \quad (iii)$$

where each X is, independently, N, O, P, or S, preferably N;

each n is independently 1 or 2;

m is 1 or 2; and each R is, independently, an alkyl group, a substituted alkyl group, an aryl group, or a substituted aryl group, provided at least one R group is an aryl or substituted aryl group.

12. The process of claim 1, wherein steps (i) to (iv) are carried out in a single reactor.

13. The process of claim 1, wherein the molecular switch comprises oxygen in the form of air.

14. The process of claim 3, wherein the oxygen and the alkyl aluminum components of the molecular switch are added sequentially.

15. The process of claim 1, wherein steps (i) to (iv) are carried out in a gas phase reactor.

16. The process of claim 1, wherein the multimodal polyolefin composition comprises:
   (i) a first polyolefin component having a Mw of 5,000 g/mol to 600,000 g/mol; a MWD of from 1.1 to about 10; and having at least one mode; and
   (ii) another polyolefin component, having a single mode; and wherein the multimodal polyolefin composition:
      (a) has a MWD of from 1.1 to about 15;
      (b) comprises less than 5 wt%, of a component having a molecular weight less than 300,000 g/mol; and
      (c) has a multimodal molecular weight distribution.

17. The process of claim 1, wherein under the polymerization conditions of step (i), the organochromium polymerization catalyst has an activity at least 70% less than the activity of the polymerization catalyst comprising a Group 4 or Group 5 transition metal.

18. The process of claim 1, wherein under the polymerization conditions of step (i), the organochromium polymerization catalyst has an activity at least 90% less than the activity of the polymerization catalyst comprising a Group 4 or Group 5 transition metal.

19. The process of claim 1, wherein under the polymerization conditions of step (iii), the organochromium polymerization catalyst has an activity at least 70% greater than the activity of the polymerization catalyst comprising a Group 4 or Group 5 transition metal.

20. The process of claim 1, wherein under the polymerization conditions of step (iii), the organochromium polymerization catalyst has an activity at least 90% greater than the activity of the polymerization catalyst comprising a Group 4 or Group 5 transition metal.

* * * * *